United States Patent [19]

Keogh

[11] Patent Number: 4,593,071

[45] Date of Patent: Jun. 3, 1986

[54] WATER-CURABLE, SILANE MODIFIED ETHYLENE POLYMERS

[75] Inventor: Michael J. Keogh, Bridgewater, N.J.

[73] Assignee: Union Carbide Corporation, Danbury, Conn.

[21] Appl. No.: 669,756

[22] Filed: Nov. 9, 1984

Related U.S. Application Data

[63] Continuation-in-part of Ser. No. 534,354, Sep. 23, 1983, Pat. No. 4,526,930.

[51] Int. Cl.⁴ .................... C08F 255/00; C08F 255/02
[52] U.S. Cl. ..................................... 525/288; 524/445; 524/451; 524/570; 524/579; 524/535; 428/391
[58] Field of Search ......................................... 525/288

[56] References Cited

U.S. PATENT DOCUMENTS

| | | | |
|---|---|---|---|
| 3,646,155 | 2/1972 | Scott | 525/288 |
| 4,228,255 | 10/1980 | Fujimoto et al. | 525/288 |
| 4,252,906 | 2/1981 | Hosokawa et al. | 525/288 |
| 4,339,507 | 7/1982 | Krutz et al. | 428/522 |
| 4,412,042 | 10/1983 | Matsuura et al. | 525/260 |

FOREIGN PATENT DOCUMENTS

| | | | |
|---|---|---|---|
| 0083780 | 7/1983 | European Pat. Off. | 525/288 |
| 51134884 | 11/1976 | Japan . | |
| 54132648 | 10/1979 | Japan . | |
| 1234034 | 6/1971 | United Kingdom . | |
| 1450934 | 9/1976 | United Kingdom . | |

OTHER PUBLICATIONS

*The Polyethylene Revolution;* Frederick J. Karol, *Chemtech* Apr. 1983; pp. 222–228.

*Primary Examiner*—Wilbert J. Briggs, Sr.
*Attorney, Agent, or Firm*—James C. Arvantes; Robert C. Brown

[57] ABSTRACT

Water-curable, silane modified ethylene polymers produced by reacting an ethylene polymer having a density of 0.875 to 0.930 gram per cc with a silane having an acryloxy moiety. The water-curable silane modified polymers, having improved properties, are particularly desirable as extrudates about wires and cables.

20 Claims, No Drawings

WATER-CURABLE, SILANE MODIFIED ETHYLENE POLYMERS

This application is a continuation-in-part of my copending application, Ser. No. 534,354, filed Sept. 23, 1983, now U.S. Pat. No. 4,526,930.

SUMMARY OF THE INVENTION

This invention relates to water-curable, silane modified ethylene polymers produced by reacting an ethylene polymer having a density of 0.850 to 0.930 gram per cc with a silane having an acryloxy moiety. The water-curable, ethylene polymers so produced are resistant to premature crosslinking during preparation and are characterized by improved mechanical properties, rendering such polymers particularly desirable for use in extrusion applications, for instance, as extrudates about wires and cables.

Currently, two major processes, so-called peroxide-curing and water-curing, are being employed in the application of protective coatings such as insulation and jacketing about wires and cables. The peroxide-curing process involves extruding compositions containing an organic peroxide about wires and cables and subjecting the resultant articles to elevated temperatures in order to cure the compositions to crosslinked products. The overall operation requires careful control of the process parameters in order to avoid undue heat and pressure build-up in the extruder. Undue heat and pressure build-up results in premature decomposition of the peroxides which in turn results in crosslinking of the compositions in the extruder. Crosslinking of the compositions in the extruder, commonly referred to as "scorch" necessitates, in extreme cases, stopping the operation and cleaning the extruder. In situations wherein "scorch" occurs but is not as severe, it has been found that the work-life of the ultimate coatings is relatively short. In addition to the processing difficulties of peroxide-curing, the peroxide containing compositions do not have that degree of resistivity to deformation, at normal peroxide loadings, demanded by many ultimate users of insulated and jacketed wire and cable articles.

The water-curing process, on the other hand, involves compositions containing hydrolyzable, silane modified thermoplastic polymers and is more commercially attractive in that a wider latitude in processing conditions is possible. That is, compositions containing water-curable, silane modified thermoplastic polymers can be extruded at temperatures far in excess of maximum processing temperatures used in extruding peroxide containing compositions. Being capable of extrusion at higher temperatures, such compositions can be extruded at faster rates and under lower pressure and consequently are more cost effective.

A problem attendant with hydrolyzable silane modified thermoplastic polymers, however, is the tendency of such polymers to prematurely crosslink or scorch during their preparation. This is especially true when the polymers being silane modified are so-called low pressure ethylene polymers, that is, polymers prepared under pressures of about 15 to about 300 psig as described, for example, in U.S. Pat. No. 4,011,382 patented Mar. 8, 1977 and in U.S. Pat. No. 4,302,565 patented Nov. 24, 1981.

DETAILED DESCRIPTION OF THE INVENTION

The present invention provides for water-curable, silane modified ethylene polymers produced by reacting an ethylene polymer having a density of 0.850 to 0.930, preferably 0.875 to 0.930, most preferably 0.88 to 0.91 gram per cc with a hydrolyzable silane of the formula:

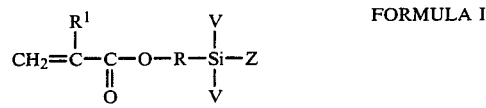

FORMULA I wherein $R^1$ is hydrogen or methyl; R is a hydrocarbon radical or an oxysubstituted hydrocarbon radical; each V, which can be the same or different, is hydrogen, a hydrocarbon radical or a hydrolyzable group; and Z is a hydrolyzable group. The water-curable, silane modified ethylene polymers of this invention are resistant to premature crosslinking during their preparation and are characterized by improved mechanical properties such as improved tensile strength, improved elongation and good flexibility. By reason of their improved properties, the water-curable, silane modified ethylene polymers of this invention are particularly desirable for use in extrusion applications, for instance, as extrudates about wires and cables.

Illustrative of suitable radicals for R in Formula I are alkylene radicals having 1 to 18 carbon atoms inclusive, preferably 1 to 6 carbon atoms inclusive, such as methylene, ethylene, propylene, butylene, hexylene and the like; alkoxy radicals having 1 to 18 carbon atoms inclusive, preferably 1 to 6 carbon atoms inclusive such as methyloxymethyl, methyloxypropyl, ethyloxyethyl, ethyloxypropyl, propyloxypropyl, propyloxybutyl, propyloxyhexyl and the like.

As stated, each V can be hydrogen, a hydrocarbon radical or a hydrolyzable group. Illustrative of suitable hydrocarbon radicals are alkyl radicals having 1 to 18 carbon atoms inclusive, preferably 1 to 6 carbon atoms inclusive such as methyl, ethyl, n-propyl, isopropyl, n-butyl, n-hexyl and the like; alkoxy radicals having 1 to 18 carbon atoms inclusive, preferably 1 to 6 carbon atoms inclusive, such as methoxy, ethoxy, propoxy, hexoxy, dodecyloxy, methoxyethoxy and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl, cyclohexyloxy and the like.

Z as previously stated, is a hydrolyzable group among which can be noted alkoxy radicals as previously described for V, oxy aryl radicals such as oxyphenyl and the like; oxyaliphatic radicals such as oxyhexyl and the like; halogens such as chlorine and the like and other hydrolyzable groups as further described in U.S. Pat. No. 3,408,240 to John B. Wiggill, patented Oct. 29, 1968.

Particularly desirable water-curable, silane modified ethylene polymers, for purposes of this invention, are produced by reacting an ethylene polymer, having the density previously described, with a silane of the formula:

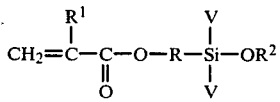
FORMULA II wherein R and R¹ are as previously defined, R² is a straight chain hydrocarbon radical having a minimum of 4 carbon atoms, generally having 4 to 18 carbon atoms inclusive or a branched chain hydrocarbon radical having a minimum of 3 carbon atoms, generally having 3 to 18 carbon atoms inclusive and each V, which can be the same or different is hydrogen, a hydrocarbon radical as previously defined or an OR² group.

Water-curable, silane modified ethylene polymers of an ethylene polymer and a silane, described in the preceding paragraph, are particularly desirable in that they possess properties previously described and are also especially resistant to moisture. These polymers, however, are made readily water-curable by the reaction therewith of an organo titanate having at least one readily hydrolyzable group, which ester exchanges with an ester group of the silane. Detailed description of activating a relatively stable, silane modified thermoplastic polymer is to be found in my copending application Ser. No. 534,354 filed Sept. 23, 1983.

Exemplary of silanes falling within the scope of Formula I and Formula II are:

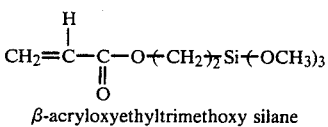
β-acryloxyethyltrimethoxy silane

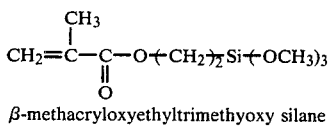
β-methacryloxyethyltrimethyoxy silane

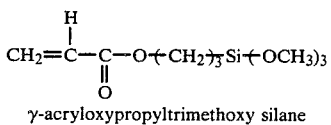
γ-acryloxypropyltrimethoxy silane

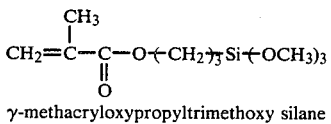
γ-methacryloxypropyltrimethoxy silane

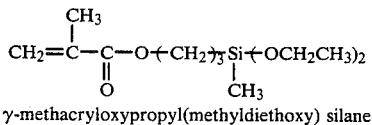
γ-methacryloxypropyl(methyldiethoxy) silane

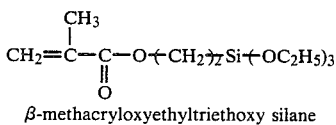
β-methacryloxyethyltriethoxy silane

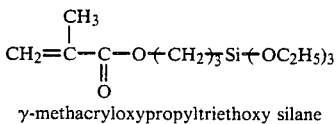
γ-methacryloxypropyltriethoxy silane

-continued

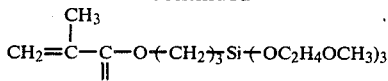
γ-methacryloxypropyl-tris-(2-methoxyethoxy) silane

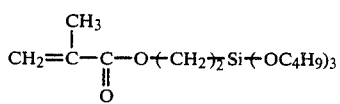
β-methacryloxyethyl-tris-(n-butoxy) silane

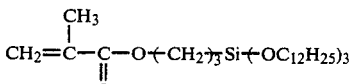
γ-methacryloxypropyl-tris-(n-dodecyloxy) silane

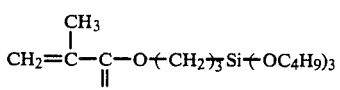
γ-methacryloxypropyl-tris-(iso-butoxy) silane

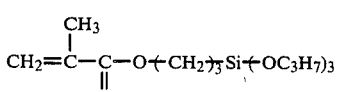
γ-methacryloxypropyl-tris-(isopropoxy) silane

Ethylene polymers, which are reacted with the unsaturated silanes defined, to produce the water-curable, silane modified polymers of this invention, have a density, as stated, of 0.850 to 0.930, preferably 0.875 to 0.930, and most preferably 0.88 to 0.91 gram per cc (ASTM D-1505-68). These ethylene polymers can be conveniently produced by reacting ethylene with at least one $C_3$ to $C_8$ alpha monoolefin such as propylene, butene-1, pentene-1, 4-methylpentene-1, hexene-1, heptene-1 and octene-1, under low pressures as further described in U.S. Pat. No. 4,302,565 and in U.S. Pat. No. 4,011,382 to produce linear, low density polymers.

The reaction of an ethylene polymer with a silane falling within the scope of Formula I or Formula II is conveniently carried out as described in U.S. Pat. No. 3,646,155, patented Feb. 29, 1972 and in U.S. Pat. No. 4,412,042, patented Oct. 25, 1983.

The curing or crosslinking of the silane modified ethylene polymers of this invention is effected by exposing the polymers to moisture. The moisture in the atmosphere is usually sufficient to permit curing to occur over a period of 48 hours, especially when a silanol condensation catalyst has been added to the polymers. Exemplary of silanol condensation catalysts are metal carboxylates such as dibutyltin dilaurate, and the like.

Also, to the silane modified polymers can be added various additives in amounts well known in the art. The addition can be accomplished prior to the formation of the silane modified polymers, as illustrated by the examples which follow or the additives can be added to the preformed, silane modified polymers.

Exemplary of such additives are those disclosed in my U.S. Pat. No. 4,353,997, granted Oct. 12, 1982.

Among such additives can be noted fillers such as carbon black, clay, talc, (magnesium silicate), calcium carbonate, silica, aluminum hydroxide and the like; halogen containing flame retardants such as decabromodiphenyl oxide, chlorinated polyethylene, polyvinyl chloride and halogenated paraffin waxes, alone, or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that the disclosure of all patents and applications noted are incorporated herein by reference.

Also, it is to be understood that mixtures of ethylene polymers and/or mixtures of unsaturated silanes can be used in preparing the silane modified polymers of this invention.

The following examples further illustrate the present invention and are not intended to limit the scope thereof.

Polymers of Examples 1 and 2 and Controls 1 and 2 were prepared according to the procedure described below wherein materials and amounts thereof, in parts by weight, are set forth in Table I.

Into a Brabender mixer, preheated to a temperature of 140° C., there was charged an ethylene-butene-1 copolymer having a density of 0.906 and polymerized 1,2-dihydro-2,3,4-trimethyl quinoline, an antioxidant. The mixture was fluxed and to the fluxed mixture was added an unsaturated silane by means of a syringe. The resultant mixture was brought to homogeniety, as evidenced by a stable torque reading. To the homogeneous mixture, there was then added di-α-cumyl peroxide. The contents of the Brabender were brought rapidly, in approximately two minutes, to a temperature of 185° C. by increasing the mixing rate, and maintained at a temperature of 185° C. for an additional 5 minutes to insure completion of the grafting reaction between the polymer and the silane. The silane modified polymer was charged into a container, which was then sealed and stored under argon gas.

TABLE I

|  | Examples$^{(a)}$ | | Controls$^{(a)}$ | |
| --- | --- | --- | --- | --- |
|  | 1 | 2 | 1 | 2 |
| Ethylene-1 copolymer$^{(b)}$ | 100 | 100 | 100 | 100 |
| γ-Methacryloxypropyltrimethoxy silane | 5.86 | 5.86 | — | — |
| Vinyltrimethoxy silane | — | — | 3.5 | 3.5 |
| Antioxidant | 0.05 | 0.05 | 0.05 | 0.05 |
| Di-α-cumyl peroxide | 0.35 | 0.17 | 0.35 | 0.17 |

$^{(a)}$parts by weight were adjusted for differences in molecular weight of silanes used. In each case, same equivalent weights of silanes were used.
$^{(b)}$low pressure polymer available from Union Carbide Corporation under the designation DFDA 1137.

Forty gram samples of each polymer were fluxed in a Brabender mixer at a temperature of 130° C. for 2 minutes. To each fluxed polymer there was then added 0.03 grams of dibutyltin dilaurate and the resultant mixture blended for one minute at a temperature of 130° C.

Test plaques, 3 inches by 3 inches by 0.0075 inch, were prepared from each polymer in a 5 minute molding cycle at a temperature of 110°-115° C. and under a pressure of 5000 psig.

Test plaques were subjected to the Monsanto Rheometer test, described in detail in U.S. Pat. No. 4,018,852, which is a measure of the degree of crosslinking. A higher reading indicates a higher degree of crosslinking.

Rheometer readings were made with respect to test plaques before and after the plaques were placed in a pressure cooker, which was at a temperature of 121° C., for one hour.

Test results are set forth in Table II.

TABLE II

|  | Polymers of | | | |
| --- | --- | --- | --- | --- |
|  | Example 1 | Example 2 | Control 1 | Control 2 |
| Rheometer - lbs-inch | | | | |
| before water immersion | 8.5 | 6 | 39 | 29 |
| after immersion | 34 | 24 | 82 | 70 |

Results show that polymers of Controls 1 and 2 are not processable due to premature crosslinking or scorch that occurred during preparation.

What is claimed is:

1. A linear, low density ethylene-$C_3$ to $C_8$ alpha monoolefin polymer having a density of 0.850 to 0.930 having grafted thereto a silane of the formula:

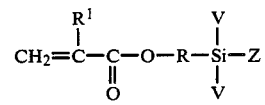

wherein $R^1$ is hydrogen or methyl, R is a hydrocarbon radical, each V is hydrogen, a hydrocarbon radical or a hydrolyzable group and Z is a hydrolyzable group.

2. An ethylene polymer as defined in claim 1 having a density of 0.875 to 0.930.

3. An ethylene polymer as defined in claim 1 having a density of 0.88 to 0.91.

4. An ethylene polymer as defined in claim 1 wherein, in the formula of the silane, $R^1$ is hydrogen or methyl, R is an alkylene radical, each V is hydrogen, an alkyl radical or an alkoxy radical and Z is an alkoxy radical.

5. An ethylene polymer as defined in claim 1 wherein, in the formula of the silane, $R^1$ is hydrogen or methyl, R is an alkylene radical having 1 to 18 carbon atoms inclusive, each V is an alkoxy radical having 1 to 18 carbon atoms inclusive and Z is an alkoxy radical having 1 to 18 carbon atoms inclusive.

6. An ethylene polymer as defined in claim 1 wherein the silane is γ-methacryloxypropyltrimethoxy silane.

7. An ethylene polymer as defined in claim 1 wherein the silane is γ-acryloxypropyltrimethoxy silane.

8. An ethylene polymer as defined in claim 1 wherein the ethylene polymer is an ethylene-butene-1 copolymer.

9. An ethylene polymer as defined in claim 1 wherein the ethylene polymer is an ethylene-butene-1 copolymer and the silane is γ-methacryloxypropyltrimethoxy silane.

10. An ethylene polymer as defined in claim 1 wherein the ethylene polymer is an ethylene-hexene-1 copolymer.

11. An ethylene polymer as defined in claim 1 wherein the ethylene polymer is an ethylene-hexene-1 copolymer and the silane is γ-methacryloxypropyltrimethoxy silane.

12. A linear, low density ethylene-$C_3$ to $C_8$ alpha monoolefin polymer having a density of 0.850 to 0.930 having grafted thereto a silane of the formula:

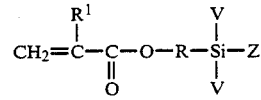

wherein $R^1$ is hydrogen or methyl, R is a hydrocarbon radical, each V is hydrogen, a hydrocarbon radical or an $OR^2$ group, $R^2$ is a straight chain hydrocarbon radical having a minimum of 4 carbon atoms or a branched chain hydrocarbon radical having a minimum of 3 carbon atoms.

13. An ethylene polymer as defined in claim 12 wherein, in the formula of the silane, $R^2$ is a straight chain hydrocarbon radical having 4 to 18 carbon atoms inclusive or a branched chain hydrocarbon radical having 3 to 18 carbon atoms inclusive.

14. An ethylene polymer as defined in claim 13 having a density of 0.875 to 0.930.

15. An ethylene polymer as defined in claim 13 having a density of 0.88 to 0.91.

16. An ethylene polymer as defined in claim 13 wherein the ethylene polymer is an ethylene-butene-1 copolymer.

17. An ethylene polymer as defined in claim 13 wherein the ethylene polymer is an ethylene-hexene-1 copolymer.

18. An ethylene polymer as defined in claim 13, wherein in the formula of the silane, $R^1$ is hydrogen or methyl, R is an alkylene radical having 1 to 18 carbon atoms inclusive, each V is $-OR^2$ and $R^2$ is a straight chain hydrocarbon radical having 4 to 18 carbon atoms inclusive or a branched chain hydrocarbon radical having 3 to 18 carbon atoms inclusive.

19. The crosslinked product of the ethylene polymer defined in claim 1.

20. A wire or cable having thereon the ethylene polymer or the crosslinked product of the ethylene polymer defined in claim 1.

* * * * *